US012592932B2

(12) United States Patent
Alburaikan et al.

(10) Patent No.: US 12,592,932 B2
(45) Date of Patent: Mar. 31, 2026

(54) METHOD AND SYSTEM FOR AN INTEGRATED PROCESS TO STREAMLINE PRIVILEGED ACCESS MANAGEMENT

(71) Applicant: SAUDI ARABIAN OIL COMPANY, Dhahran (SA)

(72) Inventors: Fatima D. Alburaikan, Dhahran (SA); Ahmad S. Lutfullah, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 372 days.

(21) Appl. No.: 18/298,867

(22) Filed: Apr. 11, 2023

(65) Prior Publication Data

US 2024/0348621 A1       Oct. 17, 2024

(51) Int. Cl.
 H04L 9/40                (2022.01)
(52) U.S. Cl.
 CPC .......... H04L 63/105 (2013.01); H04L 63/108 (2013.01); H04L 63/20 (2013.01)
(58) Field of Classification Search
 CPC ...... H04L 63/105; H04L 63/108; H04L 63/20
 USPC .......................................................... 726/4
 See application file for complete search history.

(56) References Cited

U.S. PATENT DOCUMENTS

| | | | |
|---|---|---|---|
| 9,268,926 B2 | 2/2016 | Ramstrom | |
| 9,734,349 B1 | 8/2017 | Prafullchandra et al. | |
| 10,541,988 B2 | 1/2020 | Kottahachchi et al. | |
| 11,275,861 B2 | 3/2022 | Neitzel et al. | |
| 11,303,633 B1 * | 4/2022 | Williams .............. | H04L 63/083 |
| 2017/0171214 A1 | 6/2017 | Anderson et al. | |
| 2018/0121665 A1 | 5/2018 | Anderson et al. | |
| 2018/0351957 A1 * | 12/2018 | Mott ....................... | H04L 63/20 |
| 2020/0356682 A1 * | 11/2020 | Gu ....................... | G06F 21/6218 |
| 2021/0344739 A1 * | 11/2021 | Kalva ..................... | H04L 67/02 |
| 2021/0392142 A1 | 12/2021 | Stephens et al. | |

OTHER PUBLICATIONS

F. Gaehtgens et al.; "Magic Quadrant for Privileged Access Management", Gartner; ID G00734652; Jul. 19, 2021; pp. 1-31 (31 pages).
M. J. Haber, "Privileged Access Management", apress; Privileged Attack Vectors; Second Edition; Ch. 11; 2020; pp. 151-171 (21 pages).

* cited by examiner

*Primary Examiner* — Aubrey H Wyszynski
(74) *Attorney, Agent, or Firm* — Osha Bergman Watanabe & Burton LLP

(57)                    ABSTRACT

A method for an integrated process to streamline privileged access management (PAM) allows an integration of an existing PAM system with a self-service portal at the front, and an existing back-end workflow automation engine, is disclosed. In the method, a request for an elevation for an access to an application is received from a user via a self-service portal, and the request is reviewed by a PAM system administrator. Then, a process, which enables a policy of the application corresponding to a policy chosen by the user, is initiated when the PAM system administrator approves the request. Finally, a grant of the access to the application is notified to the user via the self-service portal.

14 Claims, 6 Drawing Sheets

200 —

500

Start

502 — Retrieve an application identification number from a user request

504 — Perform query on a database for the application identification number

506 — Retrieve a corresponding script file from the database

508 — Execute the script file

510 — Has the script file run successfully ?

No

Yes

512 — Notify a grant of the user request to a user

End

METHOD AND SYSTEM FOR AN INTEGRATED PROCESS TO STREAMLINE PRIVILEGED ACCESS MANAGEMENT

BACKGROUND

In the recent years, there has been a shift in focus on securing an access to a computer infrastructure. Many Privilege Access Management (PAM) solutions were deployed by multiple vendors to enhance security, and to prevent incidents by providing a controlled elevated level of access to identified users or processes. However, each has its limitations. Many of them lack customizability and autom-atability, or the ability to integrate natively with other technologies such as a back-end orchestration and workflow engines. These limitations make stand-alone PAM solutions insufficient in managing and securing the privileged access to servers in a large organization hosting an infrastructure of thousands of applications.

Accordingly, there exists a need for a new PAM solution with an integrated process with an existing PAM system to streamline an access management that goes far beyond the potential of what stand-alone PAM solutions have.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to workflows and methods to streamline privileged access management (PAM) allowing integration of an existing PAM system with a self-service portal at the front, and an existing back-end workflow automation engine.

In one or more embodiments, a method for an integrated process to streamline PAM includes receiving a request for an elevation for an access to an application from a user via a self-service portal; reviewing the request by a PAM system administrator; initiating a process to enable a policy of the application corresponding to a policy chosen by the user, in response to an approval to the request from the PAM system administrator; and notifying a grant of the access to the application to the user via the self-service portal.

In one or more embodiments, the method further includes notifying the PAM system administrator, in response to the user choosing the custom elevation policy; publishing the custom elevation policy; revoking the access to the application after a predetermined time is expired; notifying the user of an expiration of the access to the application via the self-service portal; retrieving an application identification number from the request, and performing query on a data-base for the application identification number; and retrieving a script file corresponding to the application identification number from the database, and running the script file to enable the policy of the application.

In one or more embodiments, in the method, the user chooses at least one of a pre-published elevation policy and a custom elevation policy for the request. The custom elevation policy includes parameters and targeted comput-ing devices along with a command. The process includes transmitting data to a PAM system. The data includes a requester identifier, requested server names, an application for an elevation. The self-service portal is linked to the database to restrict the user requesting elevations for accesses to predetermined applications.

In one or more embodiments, a system for an integrated process to streamline PAM, the system includes a self-service portal for a user to submit a request for an elevation to access to an application; and a backend workflow, in communication with a PAM system administrator, to handle the request. In the system, the PAM system administrator reviews the request; the backend workflow initiates a pro-cess to enable a policy of the application corresponding to a policy chosen by the user, in response to an approval to the request from the PAM system administrator; and a notifi-cation of a grant of an access to the application is sent to the user via the self-service portal.

In one or more embodiments, a non-transitory computer readable medium stores instructions executable by a com-puter processor. The instructions include functionality for: receiving a request for an elevation for an access to an application from a user via a self-service portal; reviewing the request by a PAM system administrator; initiating a process to enable a policy of the application corresponding to a policy chosen by the user, in response to an approval to the request from the PAM system administrator; and noti-fying a grant of the access to the application to the user via the self-service portal.

Other aspects and advantages of the claimed subject matter will be apparent from the following description and the appended claims.

BRIEF DESCRIPTION OF DRAWINGS

Specific embodiments of the disclosed technology will now be described in detail with reference to the accompa-nying figures. Like elements in the various figures are denoted by like reference numerals for consistency. The advantages and features of the present invention will become better understood with reference to the following more detailed description taken in conjunction with the accompanying drawings in which.

DETAILED DESCRIPTION

Figure 1:
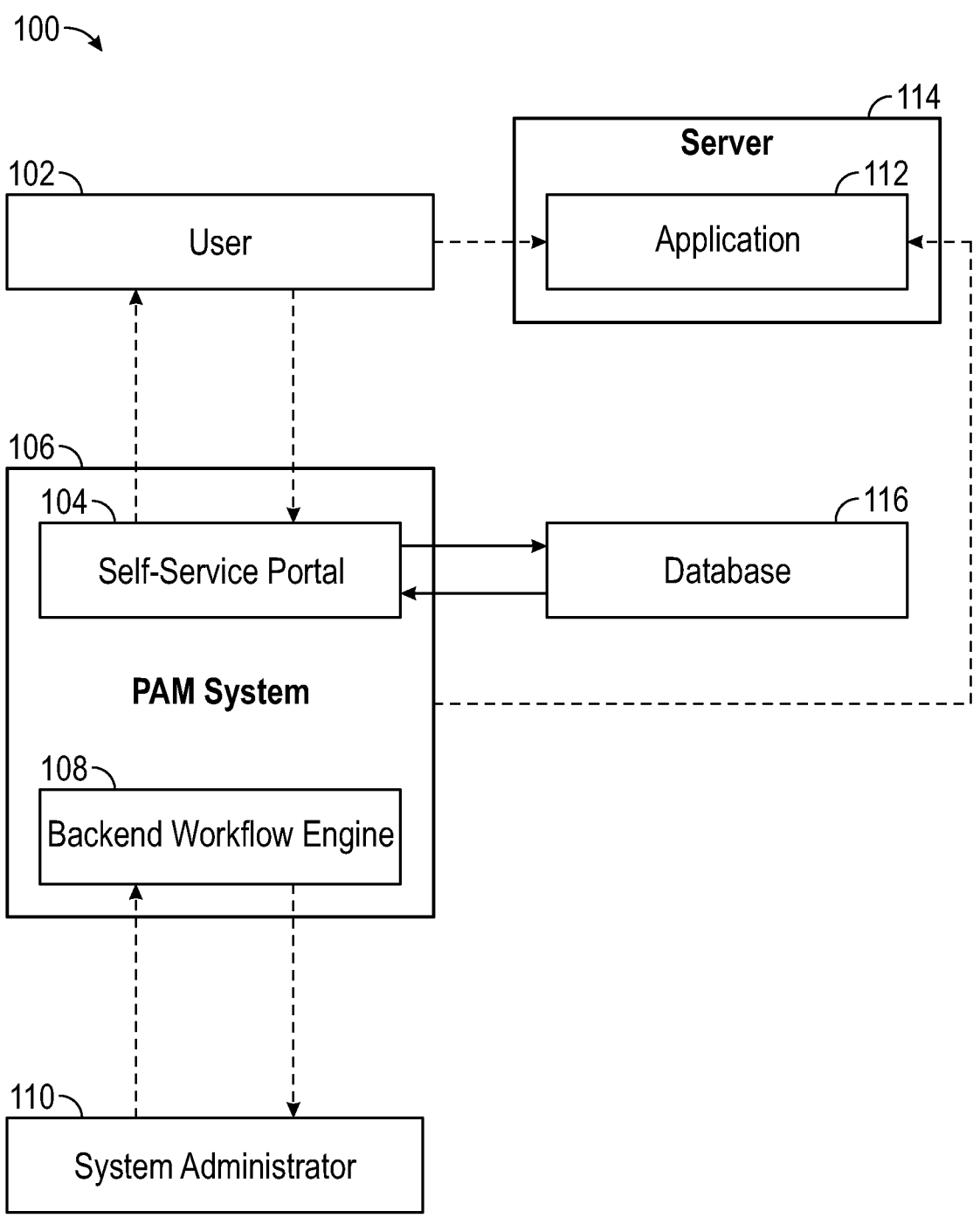
FIG. 1 illustrates a block diagram of an exemplary system for an integrated process to streamline privileged access management, in accordance with one or more embodiments of the disclosure.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before." "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-6, any component described regarding a figure, in various embodiments disclosed herein, may be equivalent to one or more like-named components described with regard to any other figure. For brevity, descriptions of these components will not be repeated regarding each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a wellbore" includes reference to one or more of such wellbores.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims may not be introduced, it would be apparent to one of ordinary skill that the subject matter of the dependent claims directed to one or more embodiments may be combined with other dependent claims.

Controlling and securing an access to a computer infrastructure are important and necessary. The Privilege Access Management (PAM) concept is defined as a security measure to manage privileged accounts as well as to delegate and elevate access to specific processes or accounts on managed systems. With respect to elevating access, PAM solutions are intended to enforce the principle of least privilege, where processes or users have the lowest needed privileges to perform their duties. Based on this, PAM solutions maintain a security model that enforces a default normal level access to processes and users unless explicitly requested to be elevated to perform changes or bypass security controls on systems or applications. This is usually implemented through a console which PAM administrators utilize to elevate specific processes or commands based on requests from users in order to execute a task that a normal access cannot execute.

However, current PAM solutions are unintelligent when it comes to agility, customizability, and ability to integrate natively with any of automation and orchestration technologies. Therefore, the current PAM solutions cannot accommodate digital transformation requirements to provide smooth and agile privileged access management processes. The current PAM process starts with a user requesting a permission to perform a task that requires elevated privilege. In this regard, a request is usually submitted through emails or a helpdesk, and then is manually reviewed and approved by a system administrator. Once approved, the system administrator will access a PAM system's console to create an elevation policy manually followed by a manual notification to be sent to the user to proceed. The elevation is granted until the system administrator explicitly access PAM's console again to retire or revoke the policy.

Further, as there are different systems involved in this process to request and manage elevations, the current process lacks the optimal auditing and logging features resulting in a poor accountability and quality management such as who did what and when. Thus, the current PAM solutions deployed to control and secure the access have limitations such as an ability to automate creating and revoking elevation policies, to provide customers with self-service portal, to enable logging and auditing, and to integrate with an approval engine. These limitations leave system administrators with a lot of repetitive and time-consuming manual work.

In one aspect, embodiments disclosed herein relate to a new process that integrates an existing PAM system with a self-service portal at the front, and an existing back-end workflow automation engine.

Embodiments of the present disclosure may provide at least one of the following advantages. Embodiments of the present disclosure integrate a self-service portal, an existing PAM system and an existing back-end workflow engine in order to achieve a fully integrated and agile customizable process. This aggregates all integrated system benefits to provide a fully autonomous, auditable, controlled, on-demand self-service process resulting in a secure, resilient, adaptable, cost-effective, and user-friendly methodology.

Further, a sophisticated integration methodology of embodiments of the present disclosure enables application owners to request from the self-service portal any pre-published policies or customized policies on a specific application. Once approved, a back-end workflow engine automatically executes a job to grant the elevation on an end point until it gets revoked after a certain period of time without any intervention from a system administrator.

FIG. 1 illustrates a block diagram of an exemplary system for an integrated process to streamline privileged access management. Block diagram 100 depicts a user 102, a PAM system 106, a system administrator 110, a server 114, and a database 116. The PAM system 106 includes a self-service portal 104 and a backend workflow engine 108. The server 114 includes an application 112 running on the server 114. The database 116 is an asset management database that contains the user's 102 organization codes, and applications that are owned and supported by the user's 102 organization which the server 114 hosts. The self-service portal 104 is linked with the database 116 to control which servers the user 102 can request. In other words, the user 102 can only request an elevation for servers that host applications associated with the user 102, that the user needs to access.

In one or more embodiments, the self-service portal 104, the PAM system 106, and the backend workflow engine 108 may be local applications running on a mobile device, a personal computer, a workstation, or a local server. The self-service portal 104, the PAM system 106, and the backend workflow engine 108 also may be cloud applications running on a remote server via the internet. The self-service portal 104 may be a standalone application, or a web application. The server 114 may be a personal computer, a workstation, a local server, or a cloud. The database 116 may be stored in one or more storages in a personal computer, a workstation, a local server, or a cloud. The application 112 may be a local application on a computing device of the user 102.

When the user 102 needs to access an application 112 in a server 114 that requires a higher/elevated security or policy than the current level, the user 102 requests an elevation of an access to the application 112 by selecting one of a pre-published policy or a customized policy via the self-service portal 104. The self-service portal 104 checks in the database 116 whether the user 102 is in an approved user list for the application 112. The request is routed through the backend workflow engine 108 to the system administrator 110 for handling the request, and for an approval of the request. Once approved by the system administrator 110, the backend workflow engine 108 executes a respective process to enable an elevation/policy for the request, allowing the user 102 to run the application 112 with elevated privileges. After a predetermined time, the elevation/policy is automatically revoked, and is able to be requested again if needed.

In one or more embodiments, a predetermined time may be 3 hours. The user 102 may resubmit the same request to extend for 3 more hours. The user 102 may access the self-service portal 104, and select one of a pre-published policy for commonly used applications identified by the system administrator 110, or request a custom policy for a specific application in the server 114.

In one or more embodiments, the pre-published policy is created by the system administrator 110, and then is provided in the self-service portal 104 as an elevation-as-a-service for the user 102. For example, a pre-published policy may be an elevation on a System Services Console to elevate an access level of the user 102 to stop/start a service, or an elevation on Task Scheduler Console. Custom policies are an elevation for applications that are not commonly used by the user 102 across an enterprise. For example, any specific applications that are only installed on a computing device of the user 102. Custom policies may include parameters and targeted machines along with a command/application. The parameters may include a path to an executable file along with an argument if required by an application. For illustration purposes only, examples of parameters are shown in Table 1 below.

TABLE 1

| Examples of Parameters | |
| --- | --- |
| Program | Argument |
| C:\Program Files\ . . . \nbjava.bat | −r 8.1.1 |
| C:\Program Files\ . . . \nbjava.bat | −r 8.2 |

Figure 2:
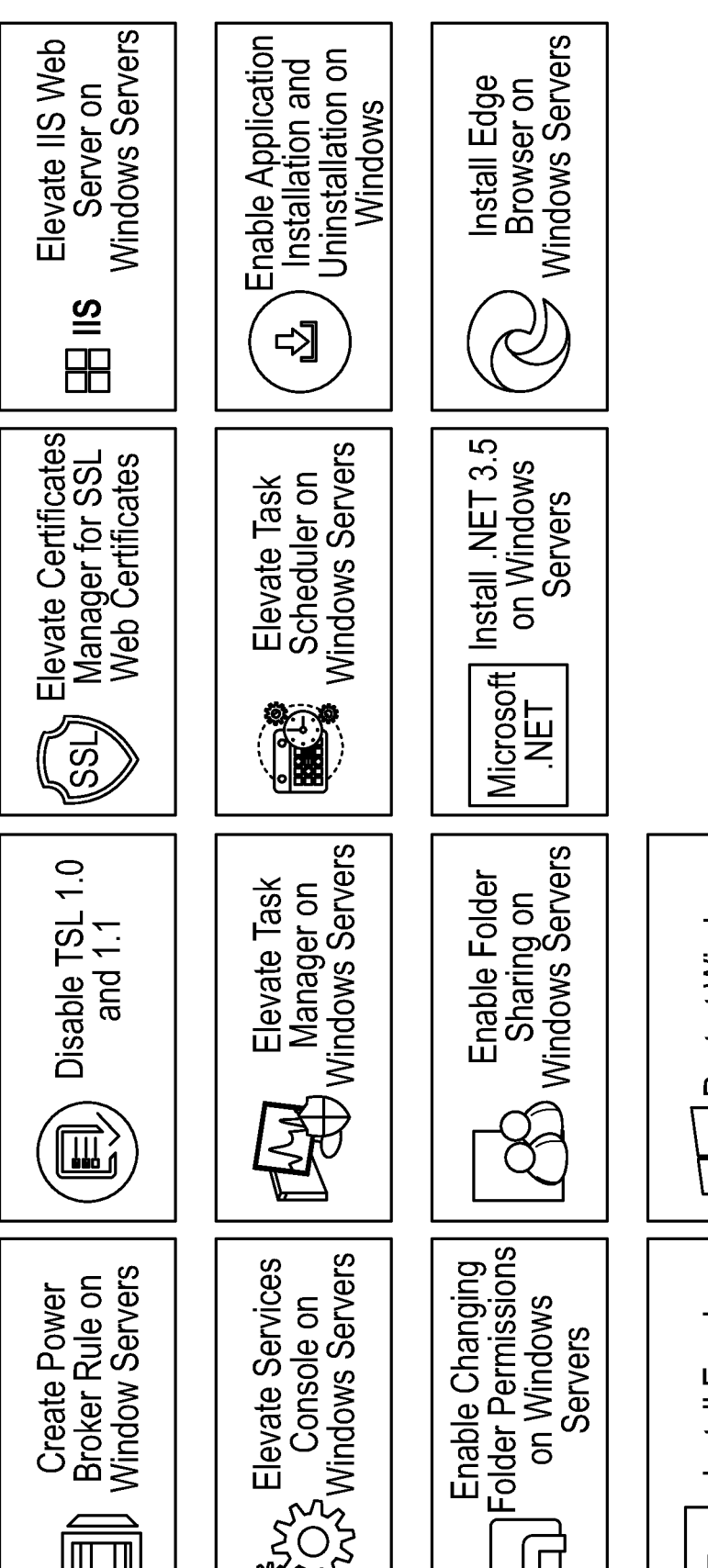
FIG. 2 illustrates an exemplary first user interface of a self-service portal in accordance with one or more embodi-ments of the disclosure.
Figure 3:
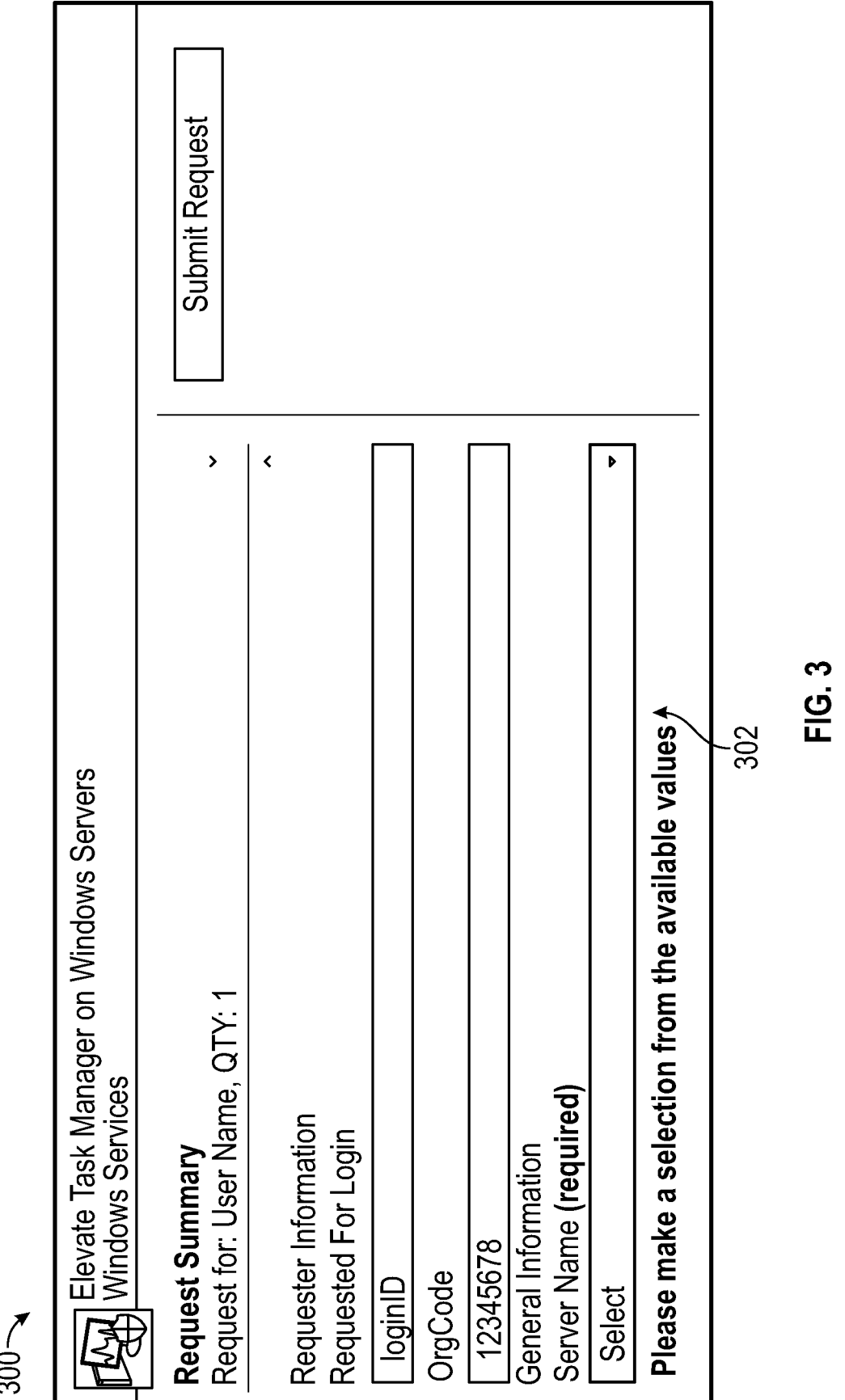
FIG. 3 illustrates an exemplary second user interface of a self-service portal in accordance with one or more embodi-ments of the disclosure.

Examples of user interfaces of the self-service portal 104 are described herein with respect to FIGS. 2 and 3. FIG. 2 illustrates an exemplary first user interface 200 of the self-service portal 104. FIG. 3 illustrates an exemplary second user interface 300 of the self-service portal 104. The first user interface 200 depicts examples of a pre-published policy for common applications. When the user 102 chooses one of these pre-published policy for an application, the second user interface 300 is displayed to the user 102. In one or more embodiments, the user 102 is prompted with a dropdown list of servers 302 to choose for which this policy/elevation will be applied/implemented on.

In one or more embodiment, the first user interface may include a selection for a specific application published for a custom policy. The second user interface may include a prompt for the user 102 to enter information for the custom policy such as an organization code, a server name, etc.

Figure 4:
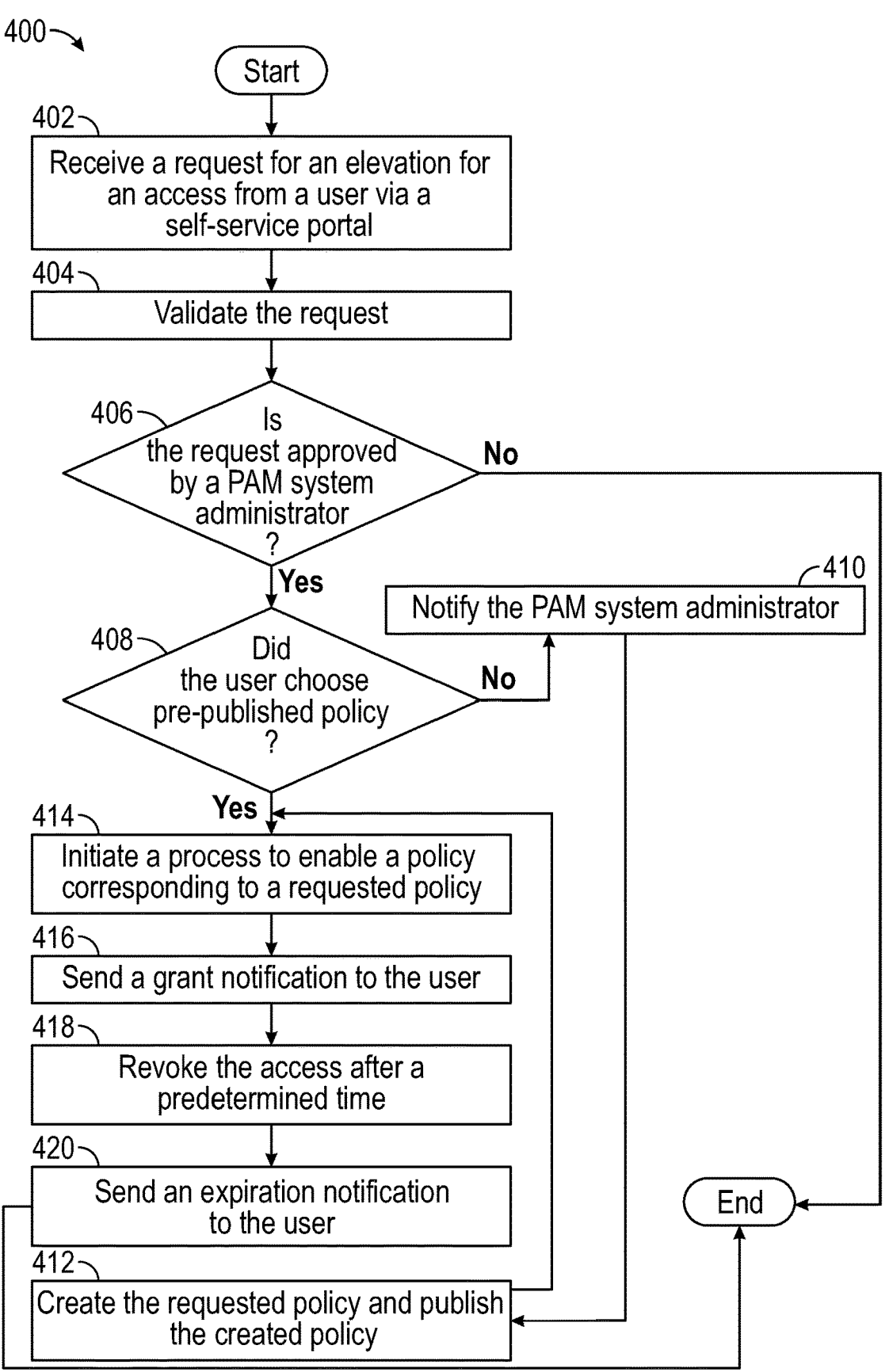
FIG. 4 illustrates is a flowchart of a method for an integrated process to streamline privileged access manage-ment, in accordance with one or more embodiments of the disclosure.

The detailed workflow of elevating a privileged access via the PAM system 106 is depicted herein with respect to FIG. 4. FIG. 4 illustrates is a flowchart of a method for an integrated process to streamline privileged access management. Method 400 may be performed by processing logic that includes hardware (e.g., circuitry, dedicated logic, programmable logic, microcode, etc.), software (e.g., instructions run on a processing device to perform hardware simulation), or a combination thereof. In one implementation, the method 400 may be performed by the PAM system 106 as described with respect to FIG. 1. The method 400 may provide an integrated process to streamline privileged access management. In describing the method 400, reference is made to FIG. 1 illustrating an implementation. It is noted the example provided in FIG. 1 is meant for illustrative purposes and is not meant to limit the scope disclosed herein.

Initially, at block 402, a request for an elevation for an access from a user is received via a self-service portal. As described with respect to FIG. 1, the PAM system 106 receives a request for an elevation for an access to the application 112 in the server 114 from the user 102 via the self-service portal 104.

At block 404, the request is validated. In FIG. 1, the request from the user 102 is notified to the system administrator 110 for validation via the backend workflow engine 108, and then the system administrator 110 validates the request whether it is proper, and is from an authorized user. For example, once a request is submitted by the user 102 and is waiting for an approval from the system administrator 110, the system administrator 110 gets notified via an email with a link to an approval window in the self-service portal 104. Then, the system administrator 110 can go to the approval window in the self-service portal 104 to approve the request.

At decision box 406, a determination is made as to whether the request is approved by a PAM system administrator. In response, if the request is approved, the method moves to decision box 408. If the request is not approved, the method 400 ends. In FIG. 1, the user 102 gets a notification of rejection with a reason for the rejection via the self-service portal 104. In one or more embodiments, the user 102 may get notified via an email that the request is rejected.

At decision box 408, a determination is made as to whether the user chose a pre-published policy with the request. In response, if the user did not choose the pre-published policy, the method moves to block 410. At block 410, the system administrator is notified of the user not choosing the pre-published policy. In FIG. 1, if the user 102 chooses a custom policy instead of a pre-published policy, the backend workflow engine 108 notifies the system administrator 110 of the custom policy. At block 412, a requested policy is created and published. The method 400, then, moves to block 414. In FIG. 1, the system administrator 110 creates a new policy corresponding to the custom policy requested by the user 102, and publishes the new policy to the PAM system 106 via the backend workflow engine 108. For example, If the custom policy is for an application that is available on all systems, the custom policy will be published and available for other users.

In one or more embodiments, if a custom policy is for a specific application that only a user has, the system administrator 110 may not published the custom policy such that the custom policy may only be available for the user and his/her organization and assets.

Referring back to decision box 408, if the user chose a pre-published policy, the method 400 moves to block 414. At block 414, a process to enable a policy corresponding to the requested policy is initiated. Referring to FIG. 1, the backend workflow engine 108 initiates a process to enable a policy to a corresponding policy chosen by the user 102.

At block 416, a grant for the request is notified to the user. In FIG. 1, a grant notification is sent to the user 102 via the self-service portal 104. At block 218, after a predetermined time, the access to the application 112 is revoked from the user. Corresponding to the revocation, at 420, an expiration notification is sent to the user 102 via the self-service portal 104.

In one or more embodiments, an expiration notification may be sent via an email. The process to enable the corresponding policy may include transmitting data that includes a requester identifier, requested server names, an application for an elevation, to the PAM system 106. In one or more embodiments, the self-service portal 104 is linked to database 116 to restrict an unauthorized user requesting elevations for accesses to predetermined applications. For example, a validation between the self-service portal 104 and the database 116 ensures that the user 102 can only request elevations to servers that hosts applications owned and supported by an organization that the user 102 belongs to.

In one or more embodiments, the system administrator 110 may validate an application path and an argument of a custom policy request.

Figure 5:
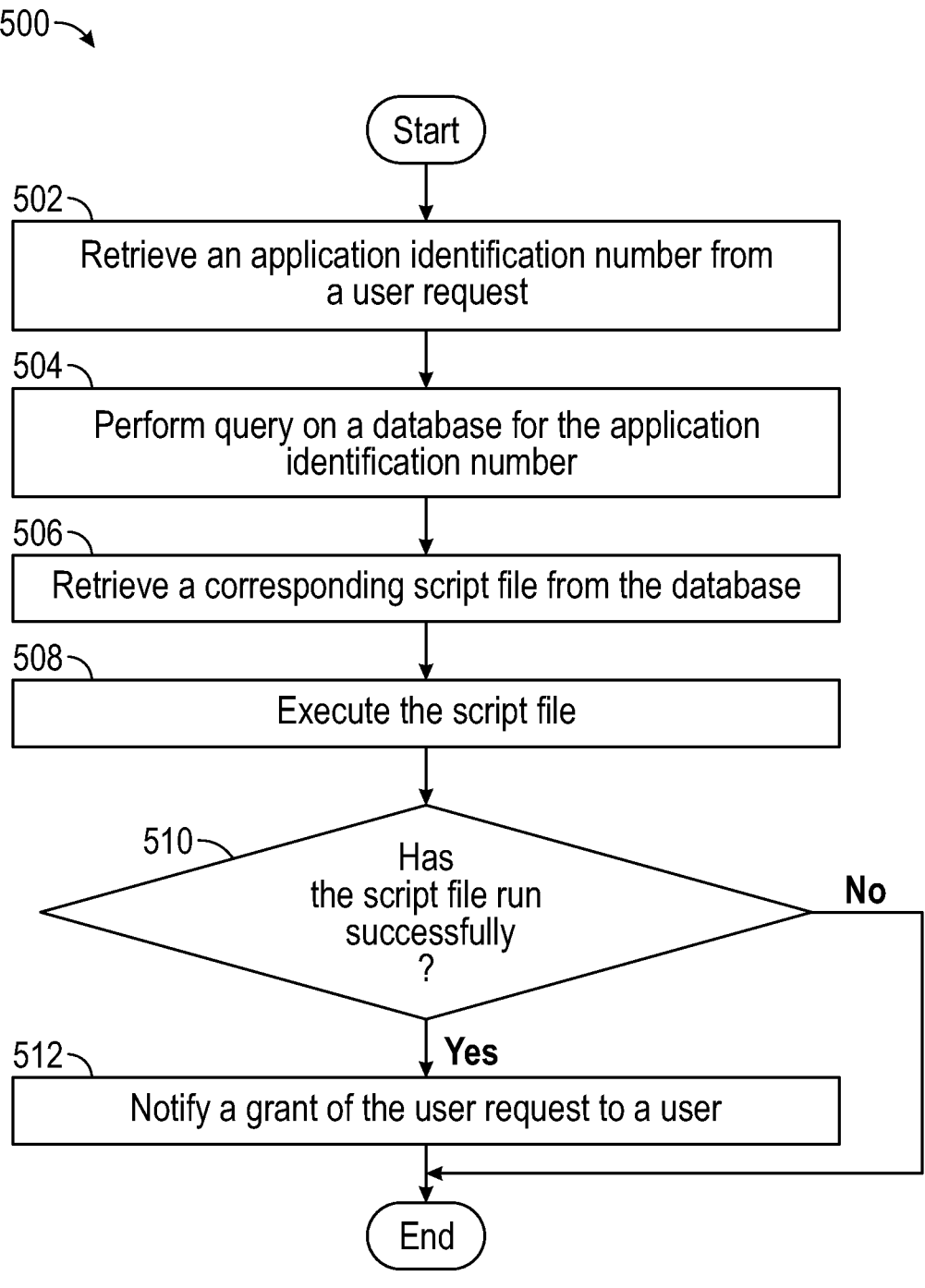
FIG. 5 illustrates is a flowchart of a method for enabling a policy corresponding to a user requested policy, in accor-dance with one or more embodiments of the disclosure.

The further detailed workflow of a process enabling a policy corresponding to a user requested policy in FIG. 4 is depicted herein with respect to FIG. 5. Specifically, FIG. 5 illustrates is a flowchart of a method for enabling a policy corresponding to a user requested policy. In describing the method 500, reference is made to FIGS. 1 and 4.

Initially, at block 502, an application identification number from a user request is retrieved. For example, an application identification number included in the request in FIG. 4 is retrieved. At block 504, a query on a database is performed for the application identification number. For Example, a query on the database 116 is performed for the application identification number.

At block 506, retrieve a corresponding script file from the database. For Example, a corresponding script file is retrieved from the database 116 once the query is done. The script file connects to a rule that corresponds to a policy requested, and add a requested server to the rule.

At block 508, the script file is executed. At decision box 510, whether script file has run successfully is determined. If the script file has not run successfully, the method 500 ends. If the script file has run successfully, the method 500 moves block 512. At block 512, a grant of the user request is notified to a user. For example, a grant of elevation request is notified to the user 102.

In one or more embodiments, each published policy may include a unique application identifier number and a corresponding elevation rule created in the PAM system 106.

Figure 6:
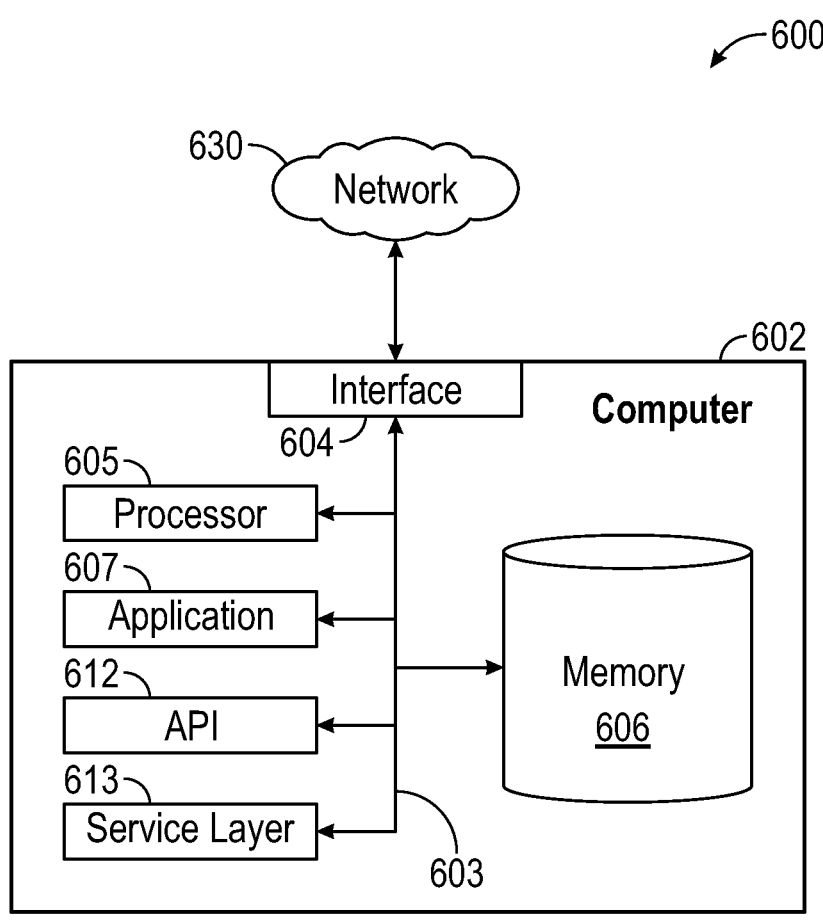
FIG. 6 illustrates a block diagram of an exemplary com-puter device operating, in accordance with one or more embodiments of the disclosure.

FIG. 6 is a block diagram of a computer system 602 configured to provide computational functionalities associated with a method for an integrated process to streamline privileged access management as described herein.

The illustrated computer system 602 is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer system 602 includes a computer that includes an input device, such as a keypad, keyboard, touch screen, or other device that can accept user information, and an output device that conveys information associated with the operation of the computer system 602, including digital data, visual, or audio information (or a combination of information), or a GUI.

The illustrated computer system 602 is communicably coupled with a network 630 or cloud. In some implementations, one or more components of the computer system 602 are configured to operate within environments, including cloud-computing-based, local, global, or other environment (or a combination of environments).

At a high level, the computer system 602 is an electronic computing device operable to receive, transmit, process, store, or manage data and information associated with the described subject matter. According to some implementations, the computer system 602 also includes or is communicably coupled with an application server, e-mail server, web server, caching server, streaming data server, business intelligence (BI) server, or other server (or a combination of servers) via the network 630.

Each of the components of the computer system 602 communicates using a system bus 603. In some implementations, any or all of the components of the computer system 602, both hardware or software (or a combination of hardware and software), may interface with each other or the interface 604 (or a combination of both) over the system bus 603 using an application programming interface (API) 612 or a service layer 613 (or a combination of the API 612 and service layer 613. The API 612 includes specifications for routines, data structures, and object classes. The API 612 is either computer-language independent or dependent and refer to a complete interface, a single function, or even a set of APIs. The service layer 613 provides software services to the computer system 602 or other components (whether or not illustrated) that are communicably coupled to the computer system 602. The functionality of the computer system 602 is accessible for all service consumers using this service layer. Software services, such as those provided by the service layer 613, provide reusable, defined business functionalities through a defined interface. For example, the interface is software written in JAVA, C++. VB scripts or other suitable language providing generation of keys. While illustrated as an integrated component of the computer system 602, alternative implementations may illustrate the API 612 or the service layer 613 as stand-alone components in relation to other components of the computer system 602 or other components (whether or not illustrated) that are communicably coupled to the computer system 602. Moreover, any or all parts of the API 612 or the service layer 613 are implemented as child or sub-modules of another software module, enterprise application, or hardware module without departing from the scope of this disclosure.

The computer system 602 includes an interface 604. Although illustrated as a single interface 604 in FIG. 6, two or more interfaces 604 are used according to particular needs, desires, or particular implementations of the computer system 602. The interface 604 is used by the computer system 602 for communicating with other systems in a distributed environment that are connected to the network 630. Generally, the interface 604 includes logic encoded in software or hardware (or a combination of software and hardware) and operable to communicate with the network 630 or cloud. More specifically, the interface 604 includes software supporting one or more communication protocols associated with communications such that the network 630 or interface's hardware is operable to communicate physical signals within and outside of the illustrated computer system 602.

Further, the computer system 602 includes at least one computer processor 605. Although illustrated as a single computer processor 605 in FIG. 6, two or more processors are used according to particular needs, desires, or particular implementations of the computer system 602. Generally, the computer processor 605 executes instructions according to a method and an algorithm of parsing and converting texts to perform the operations of the computer system 602 and any algorithms, methods, functions, processes, flows, and procedures as described in the instant disclosure to convert unstructured documents to structured documents.

The computer system 602 also includes a memory 606 that stores instructions and output data for the computer system 602 or other components (or a combination of both) that is connected to the network 630. In one or more embodiments, the memory 606 may be a non-transitory computer-readable storage medium. For example, the memory 606 stores a method for an integrated process to streamline privileged access management consistent with this disclosure. Although illustrated as a single memory 606 in FIG. 6, two or more memories are used according to particular needs, desires, or particular implementations of the computer system 602 and the described functionality. While memory 606 is illustrated as an integral component of the computer system 602, in alternative implementations, memory 606 is external to the computer system 602.

The application 607 is an algorithmic software engine providing functionality according to particular needs, desires, or particular implementations of the computer system 602, particularly with respect to functionality described in this disclosure. For example, application 607 serves as one or more components, modules, applications, etc. Further, although illustrated as a single application 607, the application 607 is implemented as multiple applications 607 on the computer system 602. In addition, although illustrated as integral to the computer system 602, in alternative implementations, the application 607 is external to the computer system 602.

There are any number of computers associated with, or external to, a computer system containing computer system 602, each computer system 602 communicating over network 630.

In some embodiments, the computer system 602 is implemented as part of a cloud computing system. For example, a cloud computing system includes one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which are performed using one or more Internet connections. More specifically, a cloud computing system may operate according to one or more service models, such as infrastructure as a service (IaaS), platform as a service (PaaS), software as a service (SaaS), mobile "backend" as a service (MBaaS), artificial intelligence as a service (AIaaS), serverless computing, and/or function as a service (FaaS).

For purposes of this disclosure, any element mentioned in the singular also includes the plural.

Although some figures depict lines with arrows to represent intra-network or inter-network communication, in other implementations, additional arrows may be included to represent communication. Therefore, the arrows depicted by the figures do not limit the disclosure to one-directional or bi-directional communication.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method for an integrated process to streamline privileged access management (PAM), the method comprising:

receiving a request for an elevation for an access to an application from a user via a self-service portal;

reviewing the request by a PAM system administrator;

initiating a process to enable a policy of the application corresponding to a policy chosen by the user, in response to an approval to the request from the PAM system administrator; and notifying a grant of the access to the application to the user via the self-service portal, wherein the user chooses between a pre-published elevation policy that is provided in the self-service portal and a custom elevation policy that is not provided in the self-service portal, for the request, wherein the custom elevation policy comprises parameters and targeted computing devices along with a command, and wherein, in response to the user choosing the custom elevation policy, the method comprises:

notifying the PAM system administrator of the custom elevation policy; and publishing the custom elevation policy on the self-service portal.

2. The method according to claim 1, wherein the process comprises transmitting data to a PAM system.

3. The method according to claim 2, wherein the data comprises a requester identifier, requested server names, and the application for the elevation.

4. The method according to claim 1, further comprising revoking the access to the application after a predetermined time is expired.

5. The method according to claim 4, further comprising notifying the user of an expiration of the access to the application via the self-service portal.

6. The method according to claim 1, further comprising retrieving an application identification number from the request, and performing query on a database for the application identification number.

7. The method according to claim 6, further comprising retrieving a script file corresponding to the application identification number from the database, and execute the script file to enable the policy of the application.

8. The method according to claim 6, wherein the self-service portal is linked to the database to restrict the user requesting elevations for accesses to predetermined applications.

9. A system for an integrated process to streamline privileged access management (PAM), the system comprising:

a self-service portal for a user to submit a request for an elevation to access to an application; and a backend workflow, in communication with a PAM system administrator, to handle the request, wherein the PAM system administrator reviews the request, wherein the backend workflow initiates a process to enable a policy of the application corresponding to a policy chosen by the user, in response to an approval to the request from the PAM system administrator, wherein a notification of a grant of an access to the application is sent to the user via the self-service portal, wherein the user chooses between a pre-published elevation policy that is provided in the self-service portal and a custom elevation policy that is not provided in the self-service portal, for the request, wherein the custom elevation policy comprises parameters and targeted computing devices along with a command, and wherein, in response to the user choosing the custom elevation policy, the self-service portal:

notifies the PAM system administrator of the custom elevation policy; and publishes the custom elevation policy.

10. The system according to claim 9, wherein the process comprises transmitting data to the system.

11. The system according to claim 10, wherein the data comprises a requester identifier, requested server names, and the application for the elevation.

12. The system according to claim 9, wherein the self-service portal is linked to a database to restrict the user requesting elevations for accesses to predetermined applications.

13. The system according to claim 9, wherein the access to the application is revoked after a predetermined time is expired.

14. A non-transitory computer readable medium storing instructions executable by a computer processor, the instructions comprising functionality for:

receiving a request for an elevation for an access to an application from a user via a self-service portal;

reviewing the request by a PAM system administrator;

initiating a process to enable a policy of the application corresponding to a policy chosen by the user, in response to an approval to the request from the PAM system administrator; and notifying a grant of the access to the application to the user via the self-service portal, wherein the user chooses between a pre-published elevation policy that is provided in the self-service portal and a custom elevation policy that is not provided in the self-service portal, for the request, wherein the custom elevation policy comprises parameters and targeted computing devices along with a command, and wherein, in response to the user choosing the custom elevation policy, the functionality comprises:

notifying the PAM system administrator of the custom elevation policy; and publishing the custom elevation policy on the self-service portal.

*     *     *     *     *